United States Patent
Voitsechov et al.

(10) Patent No.: US 12,298,939 B2
(45) Date of Patent: May 13, 2025

(54) HARDWARE-IMPLEMENTED FILE READER

(71) Applicant: Speedata Ltd., Haifa (IL)

(72) Inventors: Dani Voitsechov, Atlit (IL); Yoav Etsion, Atlit (IL); Rafi Shalom, Petah-Tikva (IL)

(73) Assignee: Speedata Ltd., Haifa (IL)

( * ) Notice: Subject to any disclaimer, the term of this patent is extended or adjusted under 35 U.S.C. 154(b) by 0 days.

(21) Appl. No.: 18/513,714

(22) Filed: Nov. 20, 2023

(65) Prior Publication Data

US 2024/0086371 A1    Mar. 14, 2024

Related U.S. Application Data

(63) Continuation of application No. 18/154,884, filed on Jan. 16, 2023, now Pat. No. 11,874,800, which is a
(Continued)

(51) Int. Cl.
    *G06F 16/174* (2019.01)
    *G06F 16/11* (2019.01)
    (Continued)

(52) U.S. Cl.
    CPC ........ *G06F 16/1744* (2019.01); *G06F 16/116* (2019.01); *G06F 16/13* (2019.01); *G06F 16/221* (2019.01)

(58) Field of Classification Search
    CPC .. G06F 16/1744; G06F 16/221; G06F 16/116; G06F 16/13
(Continued)

(56) References Cited

U.S. PATENT DOCUMENTS 10,983,957 B2 *    4/2021    Bowman ............... G06F 16/221
2020/0081993 A1    3/2020    Rupp et al.
(Continued)

OTHER PUBLICATIONS

Gershinsky, Gidon. "Efficient Analytics on Encrypted Data". Association for Computing Machinery. Published Jun. 2018. Accessed Aug. 10, 2024 from <https://doi.org/10.1145/3211890.3211907> (Year: 2018).*

(Continued)

*Primary Examiner* — Robert W Beausoliel, Jr.
*Assistant Examiner* — Lauren Zannah Ganger
(74) *Attorney, Agent, or Firm* — Meitar Patents Ltd.; Daniel Kligler

(57) ABSTRACT

A hardware-implemented file reader includes an interface, multiple hardware-implemented column readers and a hardware-implemented record reconstructor. The interface is configured to access a file including multiple records. The records store values in accordance with a nested structure that supports optional values and repeated values. The file is stored in a columnar format having multiple columns, each column storing (i) compressed values and (ii) corresponding compressed structure information that associates the values in the column to the nested structure of the records. Each column reader is configured to be assigned to a respective selected column, and to read and decompress both the values and the structure information from at least a portion of the selected column. The record reconstructor is configured to reconstruct one or more of the records from at least portions of the columns that are read by the column readers, and to output the reconstructed records.

14 Claims, 5 Drawing Sheets

Related U.S. Application Data continuation of application No. 17/030,422, filed on Sep. 24, 2020, now Pat. No. 11,586,587.

(51) Int. Cl.
*G06F 16/13* (2019.01)
*G06F 16/22* (2019.01)

(58) Field of Classification Search
USPC .......................................... 707/693
See application file for complete search history.

(56) References Cited

U.S. PATENT DOCUMENTS

| | | | |
|---|---|---|---|
| 2020/0125751 A1* | 4/2020 | Hariharasubrahmanian | ................ H04L 9/3247 |
| 2020/0265052 A1 | 8/2020 | Fujikawa et al. | |
| 2021/0042280 A1* | 2/2021 | Sharma ............. | G06F 16/24552 |

OTHER PUBLICATIONS

Van Leeuwen, "High-Throughput Big Data Analytics Through Accelerated Parquet to Arrow Conversion," Master Thesis, Faculty of EEMCS, Delft University of Technology, Delft, The Netherlands, pp. 1-72, Aug. 17, 2019.
EP Application # 21871755.1 Search Report dated Aug. 7, 2024.

* cited by examiner

HARDWARE-IMPLEMENTED FILE READER

CROSS-REFERENCE TO RELATED APPLICATIONS

This application is a continuation of U.S. patent application Ser. No. 18/154,884, filed Jan. 16, 2023, which is a continuation of U.S. patent application Ser. No. 17/030,422, filed Sep. 24, 2020, now U.S. Pat. No. 11,586,587. The disclosures of these related applications are incorporated herein by reference.

FIELD OF THE INVENTION

The present invention relates generally to digital hardware and microprocessor design, and particularly to methods and systems for hardware-implemented reading of files.

BACKGROUND OF THE INVENTION

Apache Parquet is a popular columnar data storage format. Parquet files have a complex hierarchical structure and support multiple compression and encoding schemes. Some attempts have been made to process Parquet files in hardware. For example, Van Leeuwen et al. describe a Parquet-to-Arrow converter, in "High-throughput conversion of Apache Parquet files to Apache Arrow in-memory format using FPGAs," CompSys 2019, Jun. 4, 2019.

SUMMARY OF THE INVENTION

An embodiment of the present invention that is described herein provides a hardware-implemented file reader including an interface, multiple hardware-implemented column readers and a hardware-implemented record reconstructor. The interface is configured to access a file including multiple records. The records store values in accordance with a nested structure that supports optional values and repeated values. The file is stored in a columnar format having multiple columns, each column storing (i) compressed values and (ii) corresponding compressed structure information that associates the values in the column to the nested structure of the records. Each column reader is configured to be assigned to a respective selected column, and to read and decompress both the values and the structure information from at least a portion of the selected column. The record reconstructor is configured to reconstruct one or more of the records from at least portions of the columns that are read by the column readers, and to output the reconstructed records.

In some embodiments, the columnar format is a Parquet format, and the structure information includes repetition levels and definition levels of the values. In an embodiment, the record reconstructor is configured to apply backpressure to one or more of the column readers, so as to align respective outputs of the column readers to belong to no more than a predefined number of neighboring records.

In an example embodiment, the record reconstructor is configured to determine a respective data size that needs to be obtained from each of the column readers per record, and to maintain alignment among the column readers by obtaining the determined data size from each column reader. In a disclosed embodiment, a given column reader is configured to align at least some of the decompressed values with the corresponding decompressed structure information, before reading and decompressing subsequent values and subsequent structure information from the selected column.

In some embodiments, a given column reader includes a values reader configured to read and decompress the values of the selected column, and one or more structure-information readers configured to read and decompress the structure information of the selected column. In an example embodiment, the structure information includes repetition levels and definition levels of the values, and the structure-information readers include a repetition-level reader configured to read and decompress the repetition levels, and a definition-level reader configured to read and decompress the definition levels. In another embodiment, a given column reader includes a single reader configured to read and decompress, in alternation, both the values of the selected column and the structure information of the selected column.

In yet another embodiment, in reconstructing a nested record, the record reconstructor is configured to explode one or more nesting levels of the nested record, thereby outputting multiple records in place of the nested records. In still another embodiment, in response to a request to reconstruct a set of columns that is larger than a number of the column readers, the record reconstructor is configured to reconstruct and output two or more sets of partial records, each corresponding to a respective subset of the requested set of columns.

In some embodiments the file reader further includes a hardware-implemented dictionary circuit, which is configured to read from the file a dictionary that represents some of the values with respective keys, and to subsequently translate keys read from the file into the corresponding values, so as to place the translated values in the reconstructed records. In an embodiment, the file reader includes a dictionary data structure that maps the keys to the respective values, and the dictionary circuit is configured to populate the dictionary data structure upon reading the dictionary from the file. In an embodiment, the dictionary circuit is configured to hold a portion of the dictionary in a cache.

In some embodiments, one or more of the column readers and the record reconstructor are configured to modify one or more of the values read from the file. In an example embodiment, the record reconstructor is configured to output either only the modified values, or both the values read from the file and modified values. In an embodiment, the record reconstructor is configured to specify modification of the values based on a received query.

In another embodiment, the record reconstructor is configured to filter the records based on one or both of (i) a criterion defined over one or more of the values, and (ii) a received query. In a disclosed embodiment, the record reconstructor includes multiple processing engines configured to reconstruct multiple respective records simultaneously.

In some embodiments, the record reconstructor is configured to reconstruct multiple streams of records in parallel. In an embodiment, the record reconstructor is configured to reconstruct the multiple streams of records independently of one another. In a disclosed embodiment, the record reconstructor is configured to apply backpressure to the column readers only for a selected subset of the streams of records.

There is additionally provided, in accordance with an embodiment of the present invention, a method for hardware-implemented file readout. The method includes accessing a file using multiple hardware-implemented column readers. The file includes multiple records, and the records store values in accordance with a nested structure that supports optional values and repeated values. The file is stored in a columnar format having multiple columns, each column storing (i) compressed values and (ii) corresponding compressed structure information that associates the values in the column to the nested structure of the records. Each column reader is assigned to a respective selected column, and both the values and the structure information are read and decompressed from at least a portion of the selected column. Using a hardware-implemented record reconstructor, one or more of the records are reconstructed from at least portions of the columns that are read by the column readers, and the reconstructed records are output.

The present invention will be more fully understood from the following detailed description of the embodiments thereof, taken together with the drawings in which:

DETAILED DESCRIPTION OF EMBODIMENTS

Overview

Figure 1:
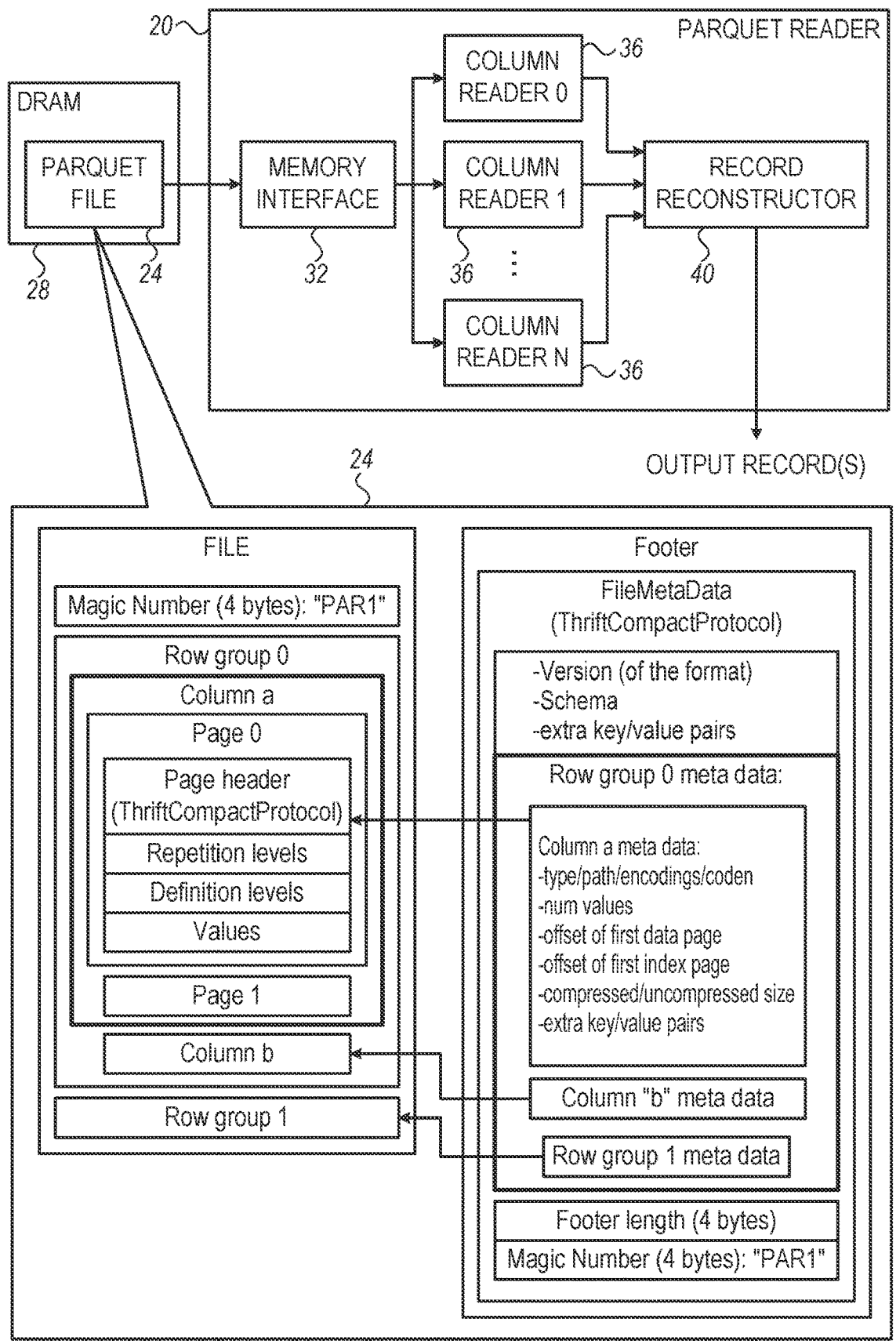
FIG. 1 is a block diagram that schematically illustrates a hardware-implemented Parquet reader, in accordance with an embodiment of the present invention.

Embodiments of the present invention that are described herein provide hardware-implemented readers for file formats such as Parquet, and associated methods. The disclosed techniques can be implemented, for example, as part of a microprocessor that is optimized for database applications, or in a standalone device.

A Parquet file stores, in columnar format, data that was originally represented as a plurality of records, each having multiple columns that store respective values. The records may have a nested structure in which values may be defined as "required", "optional" or "repeated". Consider, for example, an example in which each record stores a required person's first name, a required last name, optional children's names, and optional grandchildren's names. In nested form, such a record can be written as follows:

| First name | Last name | Children | Grandchildren |
|---|---|---|---|
| John | Smith | Tom | Alice |
| | | | Bob |
| | | Dick | — |
| | | Harry | Charlie |
| | | | Dan |
| | | | Edna |

An alternative representation for such a record would be:

| | | |
|---|---|---|
| John | Smith | {{Tom, {Alice, Bob}}, {Dick}, {Harry, {Charlie, Dan, Edna}} |

In the Parquet format, the nested structure of the records, which supports optional values and repeated values, is represented by "repetition levels" and "definition levels". The Parquet format, and specifically the use of repetition levels and definition levels for representing a nested record structure, are described in detail, for example, in an article entitled "Dremel made simple with Parquet," September, 2013, and in "Dremel: Interactive Analysis of Web-Scale Datasets," Melnik et al., Proceedings of the $36^{th}$ International Conference on Very Large Data Bases, 2010, pages 330-339.

In accordance with the Parquet format, the original table is divided into row groups that are stored one after the other in a file. The portion of a column that belongs to a given row group is referred to as a "column-chunk". The data of each row group is stored in the file column-chunk by column-chunk, making the data highly compressible. Each column-chunk is divided into pages, which are stored one after the other. Each page comprises a header, followed by the repetition levels of the page, followed by the definition levels of the page, followed by the values of the page. The repetition levels, definition levels and values are all compressed, e.g., using Gzip or Snappy compression.

In some embodiments, a hardware-implemented reader is configured to read and decompress data from a Parquet file, and to reconstruct selected records of the original table, without having to read and decompress the entire file. To this end, the reader is configured to read and decompress data from multiple different column-chunks in parallel, and to align data from different column-chunks that belongs to the same record. The reader uses the alignment to reconstruct entire records from the data read from the various column-chunks. In some embodiments the alignment is implemented using a backpressure mechanism, which throttles the rate of readout from the different column-chunks. In other embodiments, the alignment is implemented by marking the read data with identifiers indicative of the records to which the data belongs.

In some embodiments, the reader comprises multiple hardware-implemented column readers that operate in parallel. Each column reader is configured to be assigned to a respective selected column, and to read and decompress repetition levels, definition levels and values from the selected column. The reader further comprises a record reconstructor that aligns the data provided by the different column readers, and reconstructs records from the aligned data.

As noted above, each Parquet page comprises three successive sections—Repetition levels, definition levels, and then values. Typically, each column reader is configured to read and decompress the repetition levels, definition levels and values in a mutually-aligned manner. In one embodiment, a given column reader comprises three separate section readers that are configured to read and decompress the repetition levels, the definition levels and the values, respectively, in parallel. In another embodiment, a single section reader is configured to alternate between the repetition levels, definition levels and values.

The disclosed Parquet reader enables fast and efficient readout of data from Parquet files. The disclosed alignment mechanisms enable the reader to reconstruct selected records while minimizing readout and compression of unnecessary data. For example, unlike conventional readout schemes, the disclosed Parquet reader does not need to read and decompress an entire Parquet page in order to reconstruct a particular value.

The disclosed reader may be configured to reconstruct and output a stream of successive records, or one or more specific selected records. Various other reader features, such as on-the-fly dictionary translation, manipulation of read values, and record reconstruction with a controlled level of nesting, are also described.

Although the embodiments described herein refer mainly to the Parquet format, by way of example, the disclosed techniques can be used with other suitable file formats. For example, repetition levels and definition levels are regarded herein as one example of "structure information" used for specifying the nested structure of records. In alternative embodiments the disclosed techniques can be used for implementing readers for other formats, in which the structure information of the records is expressed in any other suitable way. One example of an alternative file format is the Apache Optimized Row Columnar (ORC) format.

System Description

FIG. 1 is a block diagram that schematically illustrates a hardware-implemented Parquet reader 20, in accordance with an embodiment of the present invention. Reader 20 is configured to read and reconstruct records from Parquet files. Typically, reader 20 is implemented in hardware, e.g., in an Integrated Circuit (IC) or Field-Programmable Gate Array (FPGA). In some embodiments, although not necessarily, reader 20 is implemented as part of a microprocessor that is optimized for database applications. In some use-cases reader 20 reconstructs and outputs one or more records from a Parquet file, e.g., in response to a database query. In other use-cases reader 20 reconstructs and outputs a stream of records, sequentially. Any other use-case can also be applied.

In the example of FIG. 1, reader 20 accesses a Parquet file 24 that is stored in a Dynamic Random Access Memory (DRAM) 28. Generally, however, reader 20 may access Parquet files 24 stored on any other suitable memory or storage medium, or over a network, e.g., by communicating with a Network Interface Controller (NIC).

An inset at the bottom of FIG. 1 illustrates the structure of Parquet file 24. As explained above, file 24 comprises multiple row groups; each row group comprises multiple column-chunks; and each column-chunk comprises multiple pages. Each page comprises a header, followed by the repetition levels of the page, followed by the definition levels of the page, followed by the values of the page. File 24 ends with a "footer" section that comprises the file metadata.

Figure 4:
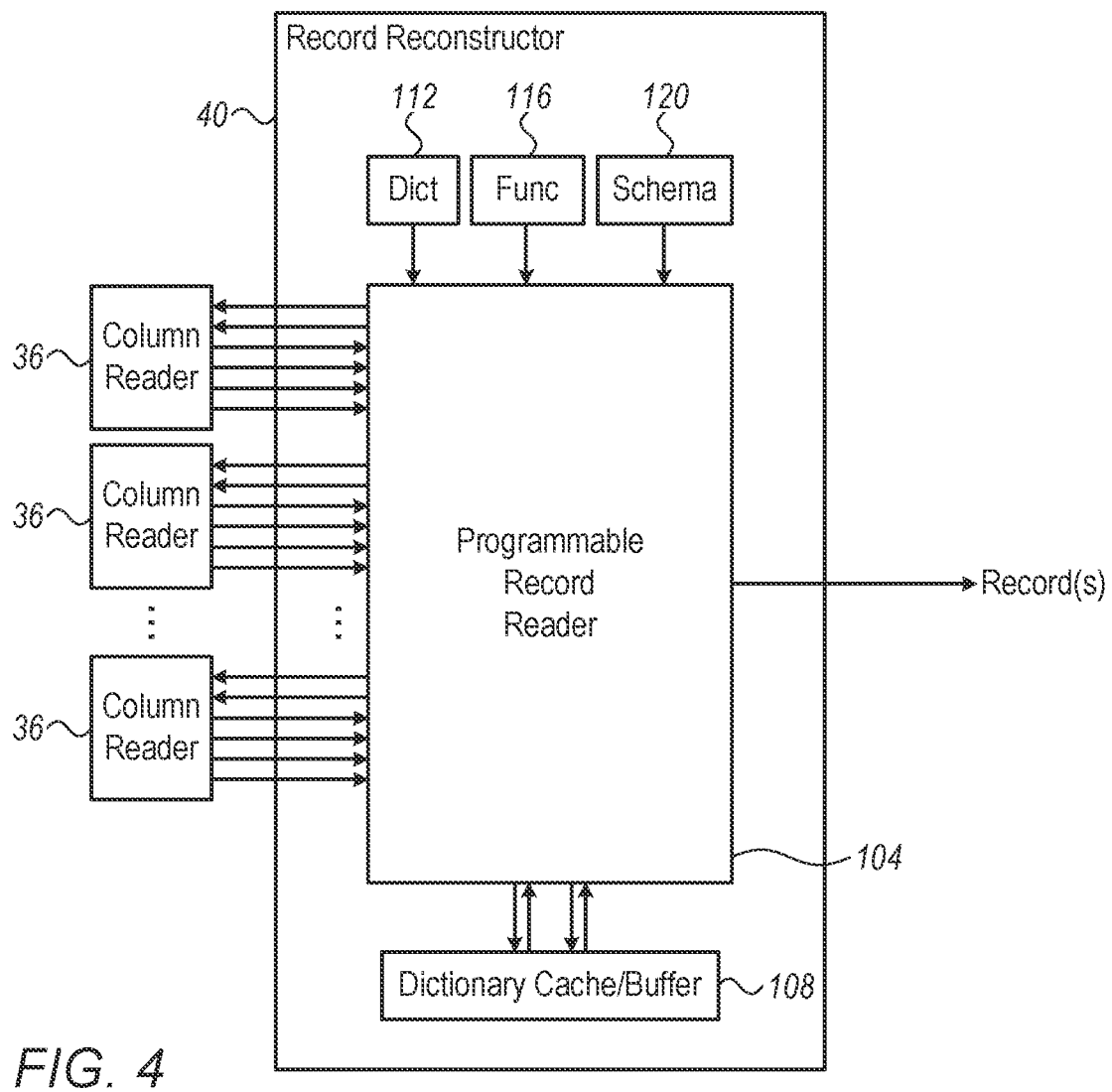
FIG. 4 is a block diagram that schematically illustrates a record reconstructor in the Parquet reader of FIG. 1, in accordance with an embodiment of the present invention.

In the present example, reader 20 comprises a memory interface 32 for accessing Parquet file 24 in memory 28. Reader 20 further comprises multiple column reader circuits 36 (referred to as "column readers" for brevity) and a record reconstruction circuit 40 (referred to as "record reconstructor" for brevity). Example implementations of column reader 36 and record reconstructor 40 are depicted in FIGS. 2 and 4 below, respectively.

Typically, in order to reconstruct one or more records from Parquet file 24, each column reader 36 is associated to a respective column. Column readers 36 then read, optionally decrypt, decompress and optionally decode the data from the respective columns and provide the decompressed data to record reconstructor 40. Record reconstructor 40 reconstructs the record(s) from the data provided by the column readers. Typically, the basic unit handled by each column readers 36 is a row group in a Parquet page.

Column Reader and Section Reader Configurations

Figure 2:
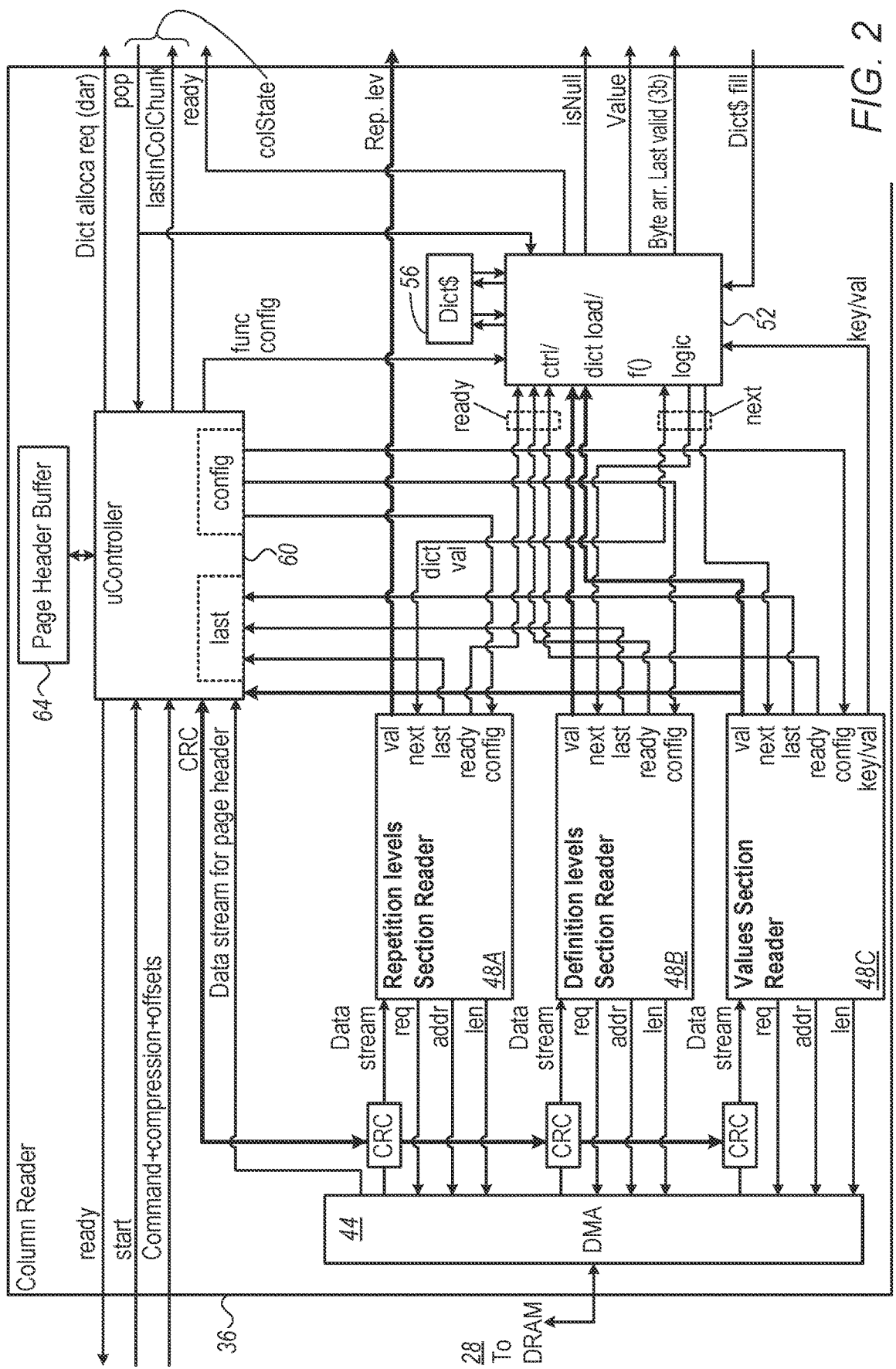
FIG. 2 is a block diagram that schematically illustrates a column reader in the Parquet reader of FIG. 1, in accordance with an embodiment of the present invention.

FIG. 2 is a block diagram that schematically illustrates column reader 36 in Parquet reader 20 of FIG. 1, in accordance with an embodiment of the present invention. The various column readers 36 of Parquet reader 20 typically all have a similar structure, and are assigned different column-chunks during operation.

Figure 3:
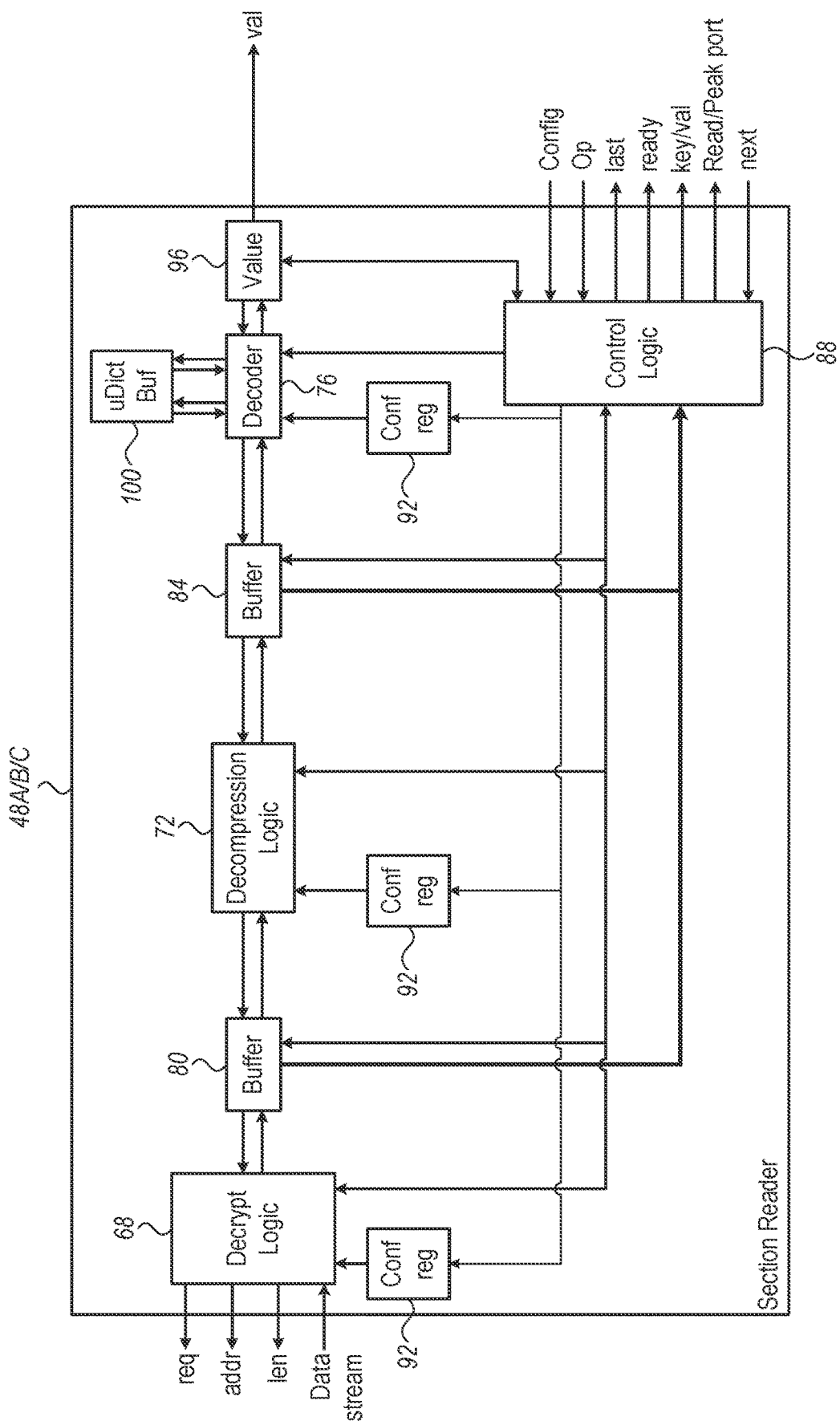
FIG. 3 is a block diagram that schematically illustrates a section reader in the column reader of FIG. 2, in accordance with an embodiment of the present invention.

In the present example, column reader 36 comprises a Direct Memory Access (DMA) engine 44 for accessing DRAM 28, and multiple section readers 48 (a repetition-levels reader 48A, a definition-levels reader 48B and a values reader 48C). The internal structure of a section reader 48, in accordance with an example embodiment, is depicted in FIG. 3 below.

When column reader 36 reads a certain Parquet page that belongs to its assigned column-chunk, readers 48A, 48B and 48C read and decompress the repetition-levels section, definition-levels section and values section of the page, respectively. Section readers 48A and 48B are regarded as an example of one or more structure-information readers, which are configured to read and decompress structure information from the column assigned to column reader 36.

Typically, the compression scheme (e.g., Gzip or Snappy) used for compressing the repetition-levels section, definition-levels section and values section has a variable compression rate. The sizes of the repetition-levels section, the definition-levels section and the values section (after compression) are thus variable and data-dependent. The starting locations of the definition-levels section and the values section in the Parquet page are therefore variable and data-dependent, as well.

In various embodiments, definition-levels reader 48B and values reader 48C may use various techniques for determining the starting locations of their respective sections in a given Parquet page. In one embodiment, definition-levels reader 48B starts reading and decompressing data from the beginning of the Parquet page (which begins with the page header and the repetition-levels section), but discards the data until reaching the start location of the definition-levels section. The objective of this initial process is merely to identify the start location of the definition-levels section. Only from this point, definition-levels reader 48B begins to output the data it decompresses.

Similarly, values reader 48C starts from the beginning of the Parquet page, and reads and decompresses the data of the repetition-levels section and the definition-levels section in order to find the start location of the values section. Values reader 48C discards the decompressed data until reaching the start location of the values section. Only from this point, values reader 48C begins outputting the data it decompresses.

In an embodiment, upon starting to process a Parquet page, readers 48B and 48C carry out the initial process of finding the start locations of their respective sections. When all three section readers 48A-48C are ready, they begin reading and decompressing their respective sections in parallel, so as to align (at least approximately) the data they output. In the present context, the term "alignment" means an association between a value and the structure information (e.g., repetition level and definition level) defined for that value.

In alternative embodiments, column reader 36 need not necessarily comprise three separate section readers 48 for reading the repetition-levels section, the definition-levels section and the values section. For example, a column reader 36 may comprise a single section reader 48 coupled to three memory buffers. In such an implementation, the section reader reads and decompresses data in alternation from the repetition-levels section, the definition-levels section and the values section. The section reader buffers the decompressed data of each section in a respective buffer, and typically maintains three pointers that track the next location being read from each section.

In yet another embodiment, the column reader may comprise a single section reader 48 that (i) reads and decompresses corresponding data from the repetition-levels section and from the definition-levels section into a buffer, and then (ii) reads and decompresses the corresponding data from the values section, and (iii) aligns the value with its repetition level and definition level.

Further alternatively, column reader 36 may be implemented in any other way, and using any other suitable number of section readers 48. In a typical implementation, the column reader reads, decompresses and aligns triplets of {repetition level, definition level, value} one by one, rather than reading and decompressing an entire Parquet page before alignment. In other words, the column reader typically reads, decompresses and aligns one triplet before progressing to read, decompress and align the next triplet.

In the embodiment of FIG. 2, column reader 36 further comprises a microcontroller 60 that is configured to manage and control the operation of the column reader. Among other tasks, microcontroller 60 is configured to parse the page header of the Parquet page being read. Microcontroller 60 stores the page header in a buffer 64.

In some embodiments, column reader 36 further comprises Cyclic Redundancy Check (CRC) blocks that are coupled to DMA engine 44. The CRC blocks verify the CRC on the repetition-levels data stream, the definition-levels data stream and the values data stream. CRC results are provided to microcontroller 60.

Column reader 36 further comprises control logic 52. Among other tasks, logic 52 is configured to trigger section readers 48A, 48B and 48C to provide respective repetition levels, definition levels and values, and to align the repetition levels, definition levels and values provided by the section readers. Logic 52 outputs the values to record reconstructor 40, in parallel to the repetition levels provided by section reader 48A.

In some embodiments, logic 52 is configured to perform dictionary translation of at least some of the values, before outputting the values to record reconstructor 40. The dictionary, or a portion thereof, is cached in a dictionary cache 56 coupled to logic 52. Aspects of dictionary translation are addressed in detail further below.

FIG. 3 is a block diagram that schematically illustrates an example section reader 48 in column reader 36 of FIG. 2, in accordance with an embodiment of the present invention. This configuration can be used for implementing repetition-levels section reader 48A, definition-levels section reader 48B and/or values section reader 48C. Section reader 48 is configured to read data from a section (a repetition-levels section, a definition-levels section or a values section) of a Parquet page.

In the present example, section reader 48 comprises configurable pipeline comprising (i) a decryption logic 68 that decrypts the data read from the section, (ii) decompression logic 72 that decompresses the decrypted data, and (iii) a decoder 76 that decodes the decompressed data. A buffer 80 buffers the decrypted data between decryption logic 68 and decompression logic 72. A buffer 84 buffers the decompressed data between decompression logic 72 and decoder 76. Value processing logic 96 is configurable to perform specified functions on the decoded values, or to otherwise manipulate the decoded values. Examples of functions are given in the "Manipulation of read values" section below. Value processing logic 96 outputs the decoded values (to control logic 52 of column reader 36 of FIG. 2).

Section reader 48 further comprises configuration registers 92 that hold the applicable configurations for decryption logic 68, decompression logic 72 and decoder 76. Configuration register 92 of decryption logic 68 may hold, for example, a decryption key to be used in decrypting the section. Configuration register 92 of decompression logic 72 may hold, for example, an identifier of the decompression scheme to be used and any relevant decompression parameters. Configuration register 92 of decoder 76 may hold, for example, an identifier of the decoding scheme to be used and any relevant decoding parameters. Any suitable decryption, decompression and decoding scheme supported by Parquet can be used.

Section reader 48 further comprises control logic 88 that configures and controls the various components of the section reader.

One of the roles performed by buffers 80 and 84 is to apply backpressure to the preceding pipeline stages. Aspects of backpressure, and the use of backpressure for alignment of data between different sections of a Parquet page and between different columns of a Parquet file (or column-chunks of a row group), are addressed further below.

In some embodiments, section reader 48 comprises a dictionary buffer 100 that is coupled to decoder 100. Buffer 100 may hold, for example, for storing dictionary values for repetition levels and definition levels.

Record Reconstruction

FIG. 4 is a block diagram that schematically illustrates record reconstructor 40 in Parquet reader 20 of FIG. 1, in accordance with an embodiment of the present invention. Reconstructor 40 receives data from the various column readers 36, and uses the data to reconstruct selected records of the Parquet file. Reconstructor 40 typically receives the data from each column reader as three vectors—(i) a values vector, (ii) a repetition-levels vector and (iii) a definition-levels vector.

Reconstructor 40 comprises a programmable record reader 104, which reconstructs records from the data provided by the column readers. The reconstructed records are provided as output of Parquet reader 20. Reconstructor 40 further comprises a Schema memory 120, which stores the schema of the Parquet file being read.

In some embodiments, record reconstructor 40 may comprise a dictionary circuit 112, which performs dictionary translation of values, and a dictionary cache 108 that stores dictionary entries. This, however, is not mandatory—In some embodiments all dictionary translation operations, including caching and cache lookup, are performed in column readers 36. Dictionary translation features, including various options for "division of labor" between the column readers and the record reconstructor, are addressed in detail further below.

In some embodiments, record reconstructor 40 further comprises a function circuit 116, which perform predefined functions on reconstructed records before outputting the records. Some functions control the level to which record reconstructor 40 explodes the nested structure of a record being reconstructed. Consider the example record depicted in the Overview section above, having two levels of nesting:

| First name | Last name | Children & grandchildren |
|---|---|---|
| John | Smith | {{Tom, {Alice, Bob}}, {Dick}, {Harry, {Charlie, Dan, Edna}} |

This record can also be presented as follows, still in a fully-nested format:

| First name | Last name | Children | Grandchildren |
|---|---|---|---|
| John | Smith | Tom | Alice |
|  |  |  | Bob |
|  |  | Dick | — |
|  |  | Harry | Charlie |
|  |  |  | Dan |
|  |  |  | Edna |

Exploding one level of nesting would produce three records:

| John | Smith | Tom | Alice |
|---|---|---|---|
|  |  |  | Bob |
| John | Smith | Dick | — |
| John | Smith | Harry | Charlie |
|  |  |  | Dan |
|  |  |  | Edna |

Exploding two levels of nesting would produce six flat (non-nested) records:

| John | Smith | Tom | Alice |
|---|---|---|---|
| John | Smith | Tom | Bob |
| John | Smith | Dick | Charlie |
| John | Smith | Harry | Dan |
| John | Smith | Harry | Edna |
| John | Smith | Harry |  |

In some embodiments, function circuit 116 is configured to specify, e.g., per record or as a general operational mode, the number of levels to be exploded in reconstructing records. The number ranges from zero up to the maximal nesting level.

In some embodiments, programmable record reader 104 in reconstructor 40 comprises multiple processing engines (e.g., cores or processors) that are configured to reconstruct multiple respective records simultaneously. Reader 104 may comprise a scheduler that flexibly assigns records to processing engines.

In some embodiments, record reconstructor 40 is configured to reconstruct multiple streams of records in parallel, e.g., simultaneously using different processing engines, or in alternation. Each record stream typically originates from a different query, and therefore typically has a separate definition of columns to be read, functions to be applied, etc. In some embodiments, record reader 104 in reconstructor 40 is configured to apply backpressure to column readers 36 only for one or more selected record streams, and refrain from using backpressure for other streams.

When reconstructing multiple record streams in alternation, reader 104 may switch between record streams once all decompression buffers 84 (FIG. 3) are empty (at the end of every row group). Alternatively, reader 104 may switch between record streams when some decompression buffers are non-empty, by saving the current state ("context") of the decompression buffers or by repeating the decompression when the same record stream re-scheduled for reconstruction. In some embodiments, record reader 104 in reconstructor 40 is configured to use context switching only for one or more selected record streams, and to wait until the end of the row group for the other streams. In any case, pausing or resuming a certain stream does not affect other streams.

In various embodiments, reader 20 may apply collaborative context switching among record streams, or preemptive context switching among record streams. In collaborative context switching, an external controller allows reader 20 to complete reconstruction of an entire row group, and only then configures it to reconstruct a row group for a different context (typically a different query relating to a different set of columns). In preemptive context switching, if reader 20 does not complete reconstruction of a row group after a predefined time period, the controller instructs reader 20 to stop in mid-row group. The controller saves the context that specifies the mid-row group state of the reader (e.g., the page index of each column reader and the value index in each of the pages), and configures the reader to operate on another row group. The controller can later configure the reader to resume reading the preempted row group from the position in which it was preempted.

In various embodiments, record reconstructor 40 may output the reconstructed records to any suitable "user system," e.g., to a processor that applies further processing to the records. In some embodiments, reconstructor 40 is capable of receiving and acting on backpressure signaling (e.g., signals or notifications) from the user system. Typically, the user system sends a "pause" notification when it is unable to receive new records, and a "resume" notification when it is again able to receive records. Upon receiving a "pause" notification, record reconstructor 40 may initially buffer the reconstructed records as long as space permits. Otherwise, the record reconstructor may propagate the backpressure onwards to the column readers.

In some embodiments, record reconstructor 40 outputs various types of metadata along with the reconstructed records. Metadata may comprise, for example, additional information relating to specific fields, e.g., a Boolean value that indicates whether the field value meets a condition, a numerical value that indicates the first letter of a string field, and the like. As another example, the metadata may indicate the level of nesting (or other structure information) in a different way than specified in the Parquet format. The metadata may indicate, for example, whether nested values in a field are NULL or not.

ADDITIONAL EMBODIMENTS AND VARIATIONS

Alignment Using Backpressure

In some embodiments, record reconstructor 40 and column readers 36, including the various section readers 48, use backpressure mechanisms for controlling the rate of readout from the various sections of the various column-chunks. This rate control is important, for example, for maintaining an alignment between the data read from different column-chunks.

In an example implementation, each column reader 36 operates independently of the other column readers, under control of record reader 104 of record reconstructor 40. Record reader 104 assigns each column reader a respective column chunk and instructs the column reader which Parquet pages to read from the column-chunk.

Since each column reader 36 operates independently, and since the data sizes and compression rates are variable, some column readers may return data at a higher rate than others. Record reader 104, however, aims to maintain alignment among column readers 36, i.e., to ensure that the data provided by the different column readers at a given time corresponds to the same record or to a small number of neighboring records.

In an example embodiment, record reader 104 may detect that, at a given time, the data provided by the various column readers belongs to more than a predefined maximum number of neighboring records. In response to detecting this misalignment, record reader 104 may temporarily pause one or more of the column readers, which are relatively fast, so as to allow one or more slower column readers to catch-up. When alignment is regained, i.e., when the data provided by the various column readers belongs to no more than the predefined maximum number of neighboring records, record reader 104 may resume the paused column readers.

One typical example of the need for alignment is when one column (denoted col1) stores integer fields, and another column (denoted col2) holds corresponding lists. In such a case, per record, the column reader assigned to col1 needs to read a single value, whereas the column reader assigned to col2 needs to read an entire list.

Typically, each column reader 36 propagates the back-pressure internally, to the various section readers 48 and within the pipeline of each section reader 48. For example, when a certain column reader 36 is paused by record reader 104, it will pause decoders 76 of section readers 48, and when resumed it will resume the decoders. Within a given section reader 48 (see FIG. 3), when a decoder 76 is paused, buffer 84 will gradually fill-up with decompressed data. When exceeding a certain fill level, buffer 84 will pause decompression logic 72. Pausing decompression logic 72 will cause buffer 80 to gradually fill-up with decrypted data. When exceeding a certain fill level, buffer 80 will pause decryption logic 68.

When the column reader resumes operation, the resumption propagates internally to the section readers in a similar manner—Each buffer (84 and 80) starts emptying and when sufficiently empty resumes the preceding pipeline stage. In various embodiments, record reader 104 and column readers 36, including section readers 48 and their internal buffers and pipeline stages, may use any suitable signaling in order to apply backpressure. For example, a "ready" signal between stages can be de-asserted for pausing, and de-asserted for resuming operation.

Record reconstructor 40 typically uses available information regarding the document being read, e.g., the structure information and/or the schema of the document, for maintaining alignment between the values provided by the various column readers 36. In some embodiments, the record reconstructor determines the data size that needs to be obtained from each column reader per record, and maintains alignment among the column readers by obtaining the appropriate data size from each column reader.

For example, if none of the columns being read has any nesting, record re-constructor 40 simply takes a value from each column. If a certain field is wide (wider than the size of the bus) the record reconstructor may need to receive this field from the column reader in multiple cycles per record, vs. a single cycle for each of the other fields. For variable-size fields, e.g., strings, the record reconstructor may check the length of the field, which is typically specified in the first several bytes of the field. The record reconstructor may then use the length information to set the number of cycles needed for receiving the field from the column reader. When a certain column has nesting, the structure information (e.g., repetition level and the definition level in Parquet) assist the record reconstructor to decide how to align this column with other columns and reconstruct the record.

In some cases, the number of columns that Parquet reader 20 is requested to read, in order to reconstruct records, is larger than the number of column readers 36. In some embodiments, record reconstructor 40 handles such a request by reconstructing partial records, based on partial subsets of the columns that do not exceed the number of column readers, and saves the partial records to memory. The sets of partial records can later be merged (e.g., by an external controller or user system) to form fully reconstructed records having any desired number of columns.

Dictionary Translation

In accordance with the Parquet format, a given column-chunk may optionally contain a dictionary. The dictionary represents commonly-occurring values (e.g., strings) with shorter keys. The subsequent Parquet pages in the column-chunk comprise the short keys instead of the longer actual values, which further reduces the file size. The dictionary may be used for representing strings and/or any other supported value type, e.g., double or long. The dictionary may represent values with constant size (i.e., all values in the dictionary have the same size) or values having a variable size (i.e., different values in the dictionary may differ in size from one another). The dictionary is typically placed at the beginning of the column-chunk, before the first Parquet page, and it is typically compressed, e.g., using Gzip or Snappy.

In some embodiments, Parquet reader 20 is configured to read, decompress and store one or more dictionaries from one or more column-chunks, to translate keys read from the column-chunks into the actual values on-the-fly, and to reconstruct and output records having the actual values.

In an embodiment, when encountering a dictionary, reader 20 decompresses the dictionary using one of section readers 48, and stores the decompressed dictionary in a close-by memory, e.g., a Static Random access Memory (SRAM). When later translating a key into an actual value, circuitry in reader 20 uses the key to derive a memory address in which the corresponding actual value is stored.

Figure 5:
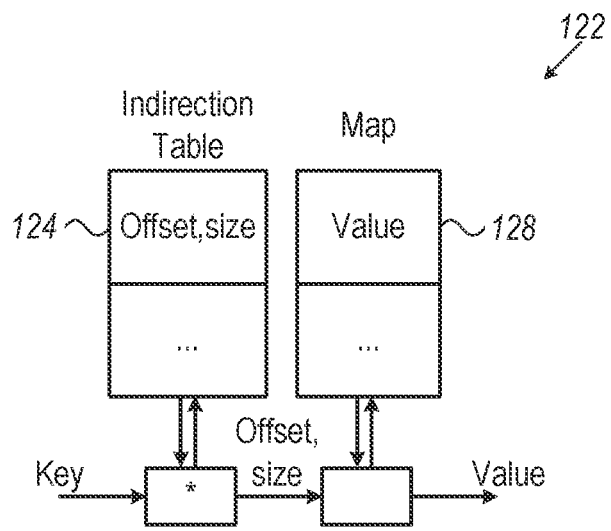
FIG. 5 is a block diagram that schematically illustrates a dictionary translation circuit in the Parquet reader of FIG. 1, in accordance with an embodiment of the present invention.

FIG. 5 is a block diagram that schematically illustrates a dictionary translation circuit 122 in Parquet reader 20 of FIG. 1, in accordance with an embodiment of the present invention. Circuit 122 may be implemented, for example, as part of logic 52 and dictionary cache 56 in column readers 36 (FIG. 2), as part of dictionary circuit 112 in record reconstructor 40 (FIG. 4), or in both. As another example, a suitable memory may be used for sharing the memory for the dictionaries between two or more column readers, possibly under an assumption that not all column readers will access the dictionary simultaneously. In yet another example, the dictionary is stored in a memory subsystem, and relevant portions of the memory are cached in a close-by cache memory.

Dictionary circuit 122 receives as input a key that is read from a Parquet page, and outputs the value that is represented by the key according to the dictionary. Circuit 122 comprises an indirection table 124 and a map 128. Map 128 holds the actual values, and is accessed by address (represented as an offset from some base address). Table 124 and map 128 are referred to herein as a "dictionary data structure." In alternative embodiments, any other suitable type of dictionary data structure can be used.

For a dictionary of constant-size values, circuit 122 calculates the offset directly from the key, e.g., by multiplying the key by the constant size of the values. This offset is then used for accessing map 128 and extracting the value therefrom. In this example, indirection table 124 is not used. For a dictionary of variable-size values, circuit 122 uses the key to access indirection table 124 and extract the offset and size therefrom. The offset and size are then used for accessing map 128 and extracting the value therefrom. In an alternative embodiment, indirection table 124 may also be used for accessing a dictionary of constant-size values, instead of using multiplication.

Typically, circuit 122 constructs the dictionary (e.g., populates map 128, and indirection table 124 if used) upon reading the dictionary from the column-chunk. Later, when reading the Parquet pages from the column-chunk, circuit 122 uses the populated map 128, and populated table 124 if used, for on-the-fly translation.

Manipulation of Read Values

In some embodiments, Parquet reader 20 is configured to modify values that were read from the Parquet file, and to insert the modified values into the reconstructed records. A manipulation is typically specified for a selected field (a selected column). Such manipulation may be performed at any stage of the readout and reconstruction process, e.g., before record reconstruction, or after reconstructing the record and before outputting the reconstructed record.

Value manipulation may be performed, for example, in column readers 36 (e.g., by value processing logic 96 in section reader 48 of FIG. 3), or in record reconstructor 40 (e.g., by function circuit 116 of FIG. 4). Manipulations performed in the column readers are typically (although not necessarily), simple, hardware-controlled operations such as comparison of a value to a threshold or simple logic functions. Manipulations performed in the record reconstructor may be more complex, software-controlled operations, e.g., derived from the query that triggered the readout operation.

Reader 20 may perform any suitable type of manipulation on values. Several demonstrative, non-limiting examples of manipulations include the following (with respect to a field (column) denoted "field1"):

Applying a function to the value of a field, e.g., Round (field1), field1*4, Sign(field1) and the like.

Outputting a Boolean flag ("0" or "1") instead of field1, depending on whether a condition defined over field1 is true or false, e.g., "field1>6". Another example of a Boolean function is a function that returns "1" if a specified value exists in a list, and "0" otherwise.

Manipulating nested values, e.g., modifying a selected item on a list or an entire list, or applying a function to a list, e.g., finding the maximum value, minimum value or sum of values of a list.

Performing multiple manipulations on a single field, e.g., outputting multiple Boolean flags in response to multiple conditions defined on the same field, e.g., "field1>7", "field1<30", "field1>100".

Performing various functions on strings, e.g., logical functions such as col1=="the" or col1=="% the" where % is a wild card.

Performing various functions on date types, e.g., a function that extracts the year and month from a date field in col4

Filtering (i.e., selectively discarding or retaining) a record depending on a criterion defined over one or more of the field values, e.g., by fusion of manipulations on multiple fields. Filtering may be performed before or after the record is reconstructed.

In various embodiments, reader 20 may perform various filtering operations to decide which records to output and which records to discard. In some embodiments, a filter is based on a single column, e.g., col1>7, in which case record reconstructor 40 outputs only records that comply with the specified condition, and discards records that do not. Note that the output is a complete record (e.g., col1, col2, . . . , col8) even though the condition pertains only to a particular column.

In another embodiment, a filter is based on a combination of two or more columns, e.g., "(Col1>7 and col2=="The record") or (extract_date(col3)–current_date<50)". In this embodiment, the columns in the filter definition may be of different types. Furthermore, various manipulations may be performed on the columns in order to reach a final decision on whether to output or discard a specific record.

In some cases, the filter is not necessarily related to the record output from reconstructor 40. Additionally or alternatively, the record being output may differ from the original record in the file. For example, consider the filter "(Col1>17 and col2 in ("The record", "The sum", "The Best")) or (extract_date(col3)–current_date<10)". In an embodiment, record reconstructor 40 check whether a record meets this condition. Upon identifying a record that meets the condition, record reconstructor 40 outputs a corresponding record with different columns, e.g., "col1-5, col2, (if col2=="The Best",1,0), extract_date(col3), extract month(col3), col4, col5, col6, 7*col7–43, is Null (col8)".

The filters above are given purely by way of example, in order to demonstrate the capabilities provided by filtering in reader 20. In alternative embodiments, any other suitable filters can be used.

Typically, when deriving a manipulated value from one or more fields of a record (e.g., performing a function on one or more fields), reader 20 outputs the manipulated value in metadata that accompanies the reconstructed record. In some embodiments, reader 20 outputs the manipulated value instead of the field value(s) read from the column(s). In other embodiments, reader 20 outputs both the manipulated value and the value(s) read from the column(s). This may typically be done by outputting an additional field.

In some embodiments, although reader 20 is typically configured based on the file being read, record reconstructor 40 may configure the value modifications based on the processing (e.g., the query being processed) and not the file, and thus further optimizes processing.

General Method Description

Figure 6:
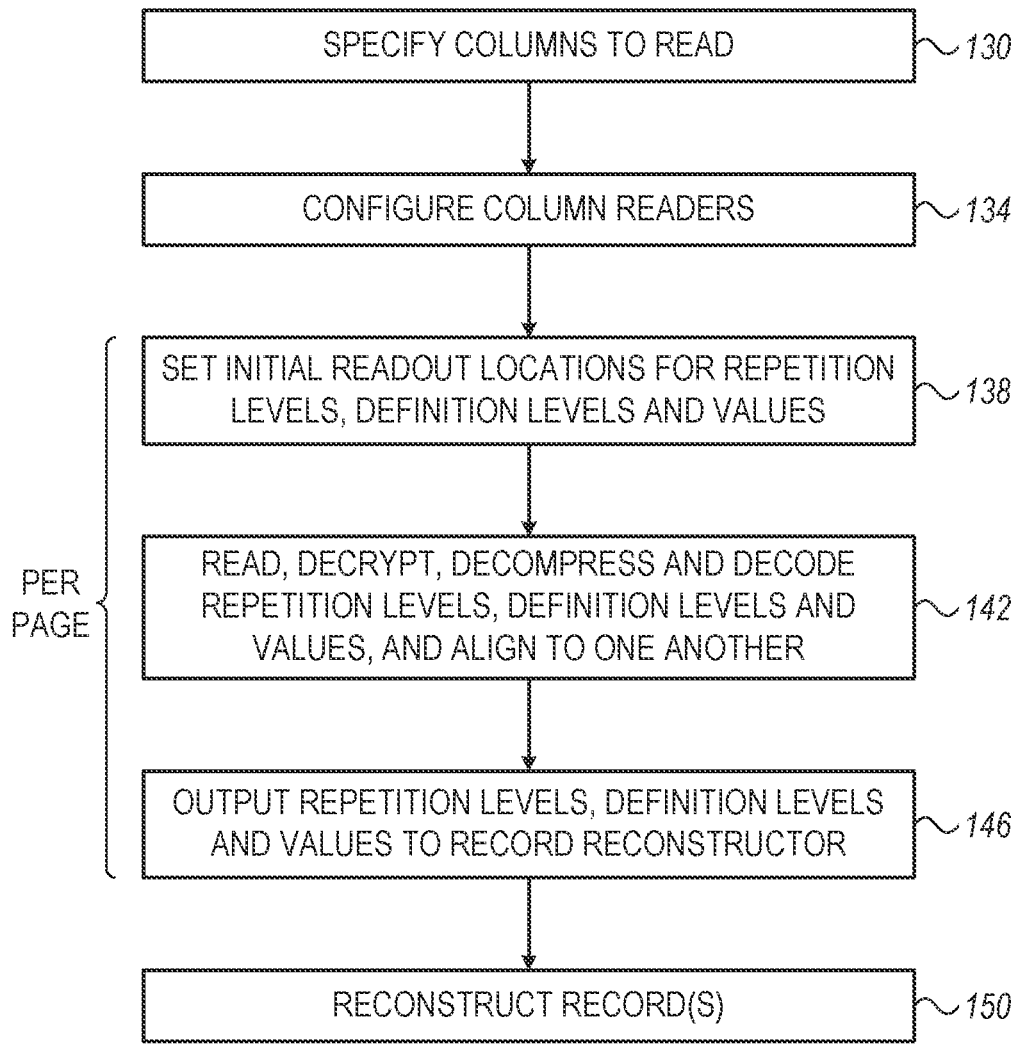
FIG. 6 is a flow chart that schematically illustrates a method for hardware-implemented readout from a Parquet file, in accordance with an embodiment of the present invention.

FIG. 6 is a flow chart that schematically illustrates a method for hardware-implemented readout from a Parquet file, carried out by Parquet reader 20, in accordance with an embodiment of the present invention. The method begins with record reconstructor 40 specifying a set of columns to be read from the Parquet file, e.g., in response to a query, at a column specification step 130. At a configuration step 134, record reconstructor 40 assigns a respective column reader 36 to each of the columns to be read, and configures column readers 36 accordingly.

The following steps (138-146) are performed for each Parquet page of each column-chunk being read, by the column reader 36 assigned to that column. At a section initialization step 138, column reader 36 initializes section readers 48 with the start locations from which the repetition-levels section, the definition-level section and the values section are to be read, at a section initialization step 138. At a readout step 142, section readers 48 read, decrypt, decompress and decode the repetition levels, definition levels and values from the Parquet page. Column reader 36 outputs the repetition levels, definition levels and values to record reconstructor 40.

At a record reconstruction step 150, record reconstructor 150 reconstructs one or more records from the repetition levels, definition levels and values provided by the various column readers 36.

The configurations of Parquet reader 20 and its components, e.g., column readers 36, section readers 48 and record reconstructor 40, as shown in FIGS. 1-5, are example configurations that are depicted purely for the sake of conceptual clarity. In alternative embodiments, any other suitable configurations can be used.

Parquet reader 20 and its components, e.g., column readers 36, section readers 48 and record reconstructor 40, may be implemented using any suitable hardware, such as in an Application-Specific Integrated Circuit (ASIC) or Field-Programmable Gate Array (FPGA).

In some embodiments, certain parts of Parquet reader 20 and its components, e.g., column readers 36, section readers 48 and record reconstructor 40, may be implemented using a programmable processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A hardware-implemented file reader, comprising:
an interface, configured to access a file comprising multiple records, wherein the records store values in accordance with a structure that supports optional values and repeated values, and wherein the file is stored in a columnar format having multiple columns, each column storing (i) compressed values and (ii) corresponding compressed structure information that associates the values in the column to the nested structure of the records;
multiple hardware-implemented column readers, each column reader configured to be assigned to a respective selected column, and to read and decompress both the values and the structure information from at least a portion of the selected column, wherein at least a given column reader among the column readers comprises a hardware-implemented pipeline configured to incrementally decrypt, decompress and decode portions of the values or the structure information; and
a hardware-implemented record reconstructor, configured to reconstruct one or more of the records from at least portions of the columns that are read by the column readers, and to output the reconstructed records.

2. The file reader according to claim 1, wherein the hardware-implemented pipeline comprises:
decryption logic configured to decrypt the values or structure information;
a first buffer configured to buffer the decrypted values or structure information produced by the decryption logic;
decompression logic configured to decompress the decrypted values or structure information buffered in the first buffer;
a second buffer configured to buffer the decompressed values or structure information produced by the decompression logic; and
a decoder configured to decode the decompressed values or structure information buffered in the second buffer.

3. The file reader according to claim 2, wherein at least the given column reader, including the hardware-implemented pipeline including the first and second buffers, is implemented within an Integrated Circuit (IC).

4. The file reader according to claim 2, wherein the second buffer is configured to apply backpressure to the decompression logic, and the first buffer is configured to apply backpressure to the decryption logic, thereby throttling a rate of readout from the selected column.

5. The file reader according to claim 1, wherein the given column reader or the record reconstructor is configured to manipulate at least some of the decoded values or structure information.

6. The file reader according to claim 1, wherein the given column reader or the record reconstructor comprises a hardware-implemented filter configured to filter the records based on one or both of (i) a criterion defined over one or more of the values, and (ii) a received query.

7. The file reader according to claim 1, wherein the given column reader is configured to align at least some of the decompressed values with the corresponding decompressed structure information, before reading and decompressing subsequent values and subsequent structure information from the selected column.

8. A method for hardware-implemented file readout, comprising:
accessing a file using multiple hardware-implemented column readers, wherein the file comprises multiple records, wherein the records store values in accordance with a structure that supports optional values and repeated values, and wherein the file is stored in a columnar format having multiple columns, each column storing (i) compressed values and (ii) corresponding compressed structure information that associates the values in the column to the nested structure of the records;
assigning each column reader to a respective selected column, and reading and decompressing both the values and the structure information from at least a portion of the selected column, including, in at least a given column reader among the column readers, incrementally decrypting, decompressing and decoding portions of the values or the structure information using a hardware-implemented pipeline; and using a hardware-implemented record reconstructor, reconstructing one or more of the records from at least portions of the columns that are read by the column readers, and outputting the reconstructed records.

9. The method according to claim 8, wherein incrementally decrypting, decompressing and decoding portions of the values or the structure information comprises:
   decrypting the values or structure information using decryption logic;
   buffering the decrypted values or structure information produced by the decryption logic in a first buffer;
   decompressing the decrypted values or structure information buffered in the first buffer using decompression logic;
   buffering the decompressed values or structure information produced by the decompression logic in a second buffer; and
   decoding the decompressed values or structure information buffered in the second buffer using a decoder.

10. The method according to claim 9, wherein at least the given column reader, including the hardware-implemented pipeline including the first and second buffers, is implemented within an Integrated Circuit (IC).

11. The method according to claim 9, further comprising applying backpressure to the decompression logic using the second buffer, and applying backpressure to the decryption logic using the first buffer, thereby throttling a rate of readout from the selected column.

12. The method according to claim 8, further comprising, in the given column reader or in the record reconstructor, manipulating at least some of the decoded values or structure information.

13. The method according to claim 8, further comprising, in the given column reader or in the record reconstructor, filtering the records using a hardware-implemented filter, based on one or both of (i) a criterion defined over one or more of the values, and (ii) a received query.

14. The method according to claim 8, further comprising aligning at least some of the decompressed values with the corresponding decompressed structure information, before reading and decompressing subsequent values and subsequent structure information from the selected column.

* * * * *